United States Patent
Jiang et al.

(10) Patent No.: US 12,114,314 B2
(45) Date of Patent: Oct. 8, 2024

(54) METHOD AND DEVICE FOR USE IN WIRELESS COMMUNICATION NODES

(71) Applicants: Qi Jiang, Shanghai (CN); Xiaobo Zhang, Shanghai (CN)

(72) Inventors: Qi Jiang, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 482 days.

(21) Appl. No.: 17/467,426

(22) Filed: Sep. 6, 2021

(65) Prior Publication Data

US 2021/0400659 A1  Dec. 23, 2021

Related U.S. Application Data

(63) Continuation of application No. PCT/CN2020/076982, filed on Feb. 27, 2020.

(30) Foreign Application Priority Data

Mar. 8, 2019 (CN) .......................... 201910174901.5

(51) Int. Cl.
 *H04W 72/21* (2023.01)
 *H04L 1/00* (2006.01)
 (Continued)

(52) U.S. Cl.
 CPC ........... *H04W 72/21* (2023.01); *H04L 1/0003* (2013.01); *H04L 5/0053* (2013.01); *H04W 72/044* (2013.01); *H04L 5/0005* (2013.01)

(58) Field of Classification Search
 None
 See application file for complete search history.

(56) References Cited

U.S. PATENT DOCUMENTS

2016/0380740 A1   12/2016  Yum et al.
2017/0332376 A1   11/2017  He et al.
(Continued)

FOREIGN PATENT DOCUMENTS

CN    103037529 A    4/2013
CN    107809801 A    3/2018
(Continued)

OTHER PUBLICATIONS

ISR in application PCT/CN2020/076982 dated Apr. 22, 2020.
(Continued)

*Primary Examiner* — Walter J Divito

(57) ABSTRACT

The present disclosure discloses a method and device for use in wireless communication nodes. A first node firstly receives a first signaling and then transmits a first radio signal and first information in a first time-frequency resource set; the first signaling is used to determine the first time-frequency resource set, and the first signaling comprises a first field, the first field being used to determine a first parameter set out of K1 parameter sets, the first parameter set comprising K2 first-type parameters, at least one of the K2 first-type parameters is used to determine a first integer, and a number of REs occupied by the first information in the first time-frequency resource set is equal to the first integer; the K1 parameter sets are related to a first condition set. The present disclosure helps improve UCI transmission performance, thus avoiding excessive uplink data resources occupied by UCI.

17 Claims, 4 Drawing Sheets

(51) Int. Cl.
H04L 5/00 (2006.01)
H04W 72/044 (2023.01)

(56) References Cited

U.S. PATENT DOCUMENTS

2019/0069322 A1    2/2019   Davydov
2021/0144700 A1*   5/2021   Lee ..................... H04L 5/0094

FOREIGN PATENT DOCUMENTS

| CN | 107852321 A | 3/2018 |
| CN | 108322296 A | 7/2018 |
| CN | 109041227 A | 12/2018 |

OTHER PUBLICATIONS

Qualcomm Inc. "Multiplexing of PUCCH and PUSCH" 3GPPTSGRAN WG1Meeting 91 R1-1721387,Dec. 1, 2017(Dec. 1, 2017),section 1.
CN201910174901.5 Notification to Grant Patent Right for Invention dated Sep. 18, 2021.
First Office Action received in application No. CN201910174901.5 dated Feb. 23,2021.
First Search Report received in application No. CN201910174901.5 dated Feb. 18, 2021.
First Office Action of Chinese patent application No. CN202111147262.7 dated Jan. 25, 2024.
First Search Report of Chinese patent application No. CN202111147262.7 dated Jan. 19, 2024.
Qualcomm Incorporated "Multiplexing of PUCCH and PUSCH" 3GPP TSG RAN WG1 Meeting 91 R1-1721387 Dec. 1, 2017.

* cited by examiner

| Corresponding to first field = 00 | Corresponding to first field = 01 | Corresponding to first field = 10 | Corresponding to first field = 11 |
|---|---|---|---|
| Parameter set#1 | Parameter set#2 | Parameter set#3 | Parameter set#4 |
| betaOffsetACK-Index1 | betaOffsetACK-Index1 | betaOffsetACK-Index1 | betaOffsetACK-Index1 |
| betaOffsetACK-Index2 | betaOffsetACK-Index2 | betaOffsetACK-Index2 | betaOffsetACK-Index2 |
| betaOffsetACK-Index3 | betaOffsetACK-Index3 | betaOffsetACK-Index3 | betaOffsetACK-Index3 |
| betaOffsetCSI-Part1-Index1 | betaOffsetCSI-Part1-Index1 | betaOffsetCSI-Part1-Index1 | betaOffsetCSI-Part1-Index1 |
| betaOffsetCSI-Part1-Index2 | betaOffsetCSI-Part1-Index2 | betaOffsetCSI-Part1-Index2 | betaOffsetCSI-Part1-Index2 |
| betaOffsetCSI-Part2-Index1 | betaOffsetCSI-Part2-Index1 | betaOffsetCSI-Part2-Index1 | betaOffsetCSI-Part2-Index1 |
| betaOffsetCSI-Part2-Index2 | betaOffsetCSI-Part2-Index2 | betaOffsetCSI-Part2-Index2 | betaOffsetCSI-Part2-Index2 |

4 parameter sets

FIG. 6

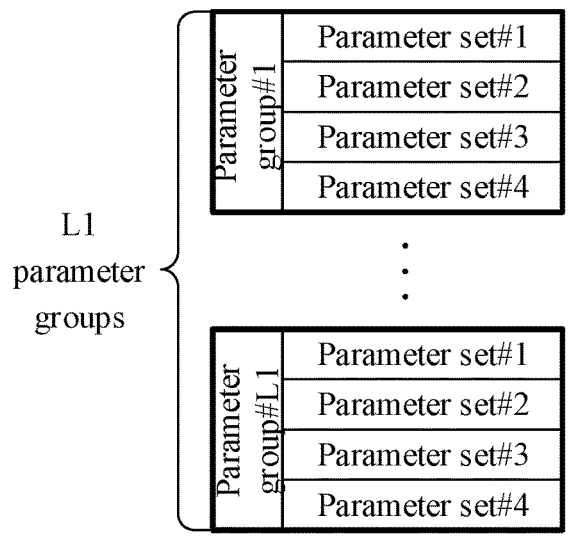

FIG. 7

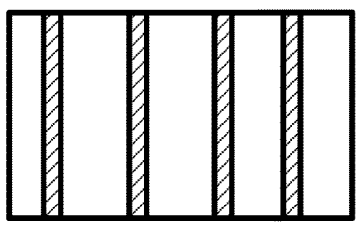

☐ time-frequency resources occupied by first radio signal
▨ time-frequency resources occupied by first information

FIG. 8

METHOD AND DEVICE FOR USE IN WIRELESS COMMUNICATION NODES

CROSS REFERENCE TO RELATED APPLICATIONS

This application is a continuation of International Application No. PCT/CN2020/076982, filed Feb. 27, 2020, claims the priority benefit of Chinese Patent Application No. 201910174901.5, filed on Mar. 8, 2019, the full disclosure of which is incorporated herein by reference.

BACKGROUND

Technical Field

The present disclosure relates to transmission methods and devices in wireless communication systems, and in particular to a transmission scheme and device of multiplexing UCI onto data channel.

Related Art

In a 5G system, Enhance Mobile Broadband (eMBB) and Ultra Reliable and Low Latency Communication (URLLC) are two typical traffic types. Targeting requirements for lower target BLER of URLLC traffic, a new Modulation and Coding Scheme (MCS) table has been defined in 3rd Generation Partner Project (3GPP) New Radio (NR) Release 15. For the purpose of supporting more demanding URLLC traffics, for example, with higher reliability (e.g., a target BLER is $10^{-6}$) or with lower delay (e.g., 0.5-1 ms), a Study Item (SI) of URLLC enhancement in New Radio (NR) Release 16 was approved at the 3rd Generation Partner Project (3GPP) Radio Access Network (RAN)#80 Plenary, and a focus of study in this SI is the enhancement of Hybrid Automatic Repeat reQuest (HARQ) feedback/Channel State Information (CSI) feedback.

SUMMARY

In a current LTE or NR system, to ensure the performance of uplink transmission, when a UE is required to transmit a Physical Uplink Control Channel (PUCCH) and a Physical Uplink Shared Channel (PUSCH) simultaneously in a subframe or a slot, Uplink Control Information (UCI) comprised in the PUCCH will be piggybacked in the PUSCH. The base station dynamically indicates a number of REs occupied by UCI by a Beta_offset Indicator field in Downlink Control Information (DCI) that schedules the PUSCH, thus adjusting the code rate of UCI to adapt to different Payload Sizes of UCI.

In Rel-16 system, to ensure the reliability and timeliness of URLLC traffic transmission, UCI in the URLLC will be piggybacked to a PUSCH in eMBB for transmission, and multiple transmissions based on repetition will be existing in the PUSCH. According to the above analysis, designs of the code rate of UCI and Beta_offset shall be reconsidered.

To address the above problem, the present disclosure provides a solution. It should be noted that if no conflict is incurred, embodiments in a first node and a second node in the present disclosure and the characteristics of the embodiments are also applicable to a base station and a User Equipment (UE), and vice versa. What's more, the embodiments in the present disclosure and the characteristics in the embodiments can be arbitrarily combined if there is no conflict.

The present disclosure provides a method in a first node for wireless communications, comprising:
  receiving a first signaling; and
  transmitting a first radio signal and first information in a first time-frequency resource set;
  herein, the first signaling is used to determine the first time-frequency resource set, and the first signaling comprises a first field, the first field comprised in the first signaling being used to determine a first parameter set out of K1 parameter sets, the first parameter set comprises K2 first-type parameters, and at least one of the K2 first-type parameters is used to determine a first integer, a number of resource elements occupied by the first information in the first time-frequency resource set is equal to the first integer, the first integer being greater than 0; the K1 parameter sets are related to a first condition set; K1 and K2 are positive integers greater than 1, respectively.

In one embodiment, an advantage of the above method lies in that when there is much difference in performance demands between UCI piggybacked into a PUSCH and the PUSCH itself; for instance, when the performance of UCI has much higher demand than the PUSCH (e.g., UCI is a Hybrid Automatic Repeat request-Acknowledgement (HARQ-ACK) for URLLC, while the PUSCH is data in eMBB), or, the performance of UCI has lower demand than the PUSCH (i.e., UCI is CSI, while the PUSCH is data after multiple repetitions of transmissions); by adjusting the range of values of Beta_Offset according to different conditions in a first condition set, the present disclosure can enhance the UCI transmission performance and spectrum efficiency.

In one embodiment, another advantage of the above method lies in that eMBB transmission and URLLC transmission will be performed simultaneously by a UE, and for scenarios with different kinds of UCI piggybacked to the PUSCH, the UE needs to select different Beta_offsets in a dynamic manner, since 4 values indicated by the current DCI are not sufficient to fulfill the range of dynamic change in multiple scenarios, the above method can be used to enlarge the dynamic selection range of Beta_Offset without increasing the number of bits in DCI.

According to one aspect of the present disclosure, the above method is characterized in that the first radio signal comprises M1 radio sub-signals, and time-domain resources occupied by any two of the M1 radio sub-signals are orthogonal, each of the M1 radio sub-signals is generated by a first bit block, and the first condition set comprises a value of M1, M1 being a positive integer greater than 1.

In one embodiment, an advantage of the above method lies in that when repetition is employed by a first radio signal, different numbers of repetitions reflect different performance requirements for the first radio signal, thus, when UCI is piggybacked in the first radio signal, different code rates corresponding to the variety of requirements shall be considered; such effect can be achieved by corresponding different parameter groups to different numbers of repetitions, along with avoidance of the introduction of new DCI bits.

According to one aspect of the present disclosure, the above method is characterized in that a Modulation and Coding Scheme (MCS) adopted by the first radio signal belongs to a first MCS set, and the first condition set comprises the first MCS set.

In one embodiment, an advantage of the above method lies in that the selection from different Modulation and Coding Schemes (MCSs) can also reflect the performance requirements of a first radio signal, by dividing possible MCSs selected by the first radio signal into multiple sets to make different sets correspond to different Beta_Offset parameter sets, thus selecting code rates of UCI adaptable to different PUSCH performance requirements.

According to one aspect of the present disclosure, the above method is characterized in that time-frequency resources occupied by the first signaling belong to a candidate time-frequency resource set, and the first condition set comprises the candidate time-frequency resource set.

In one embodiment, an advantage of the above method lies in distinguishing different performance requirements of a first radio signal through different CORESETs; for example, by placing DCI in a PUSCH scheduling URLLC and a PUSCH scheduling eMBB respectively in different CORESETs, these CORESETs correspond to different Beta_Offset parameter sets, thereby implicitly determining a Beta_Offset parameter set matching with PUSCH properties.

According to one aspect of the present disclosure, the above method is characterized in that time-domain resources occupied by the first signaling belong to a first time unit, while time-domain resources occupied by the first radio signal starts with a second time unit, the second time unit being a T-th time unit after the first time unit, T being a non-negative integer, and the first condition set comprises a value of T.

In one embodiment, an advantage of the above method lies in that the transmission delay also reflects the performance requirements of a first radio signal, for example, the transmission delay of a PUSCH in URLLC is smaller than that in eMBB, and the performance demand of URLLC is higher than eMBB; therefore, different transmission delays will influence the selection between different beta_Offset parameter sets.

According to one aspect of the present disclosure, the above method is characterized in comprising:
  receiving a second signaling and a second radio signal;
  herein, the second signaling comprises a group of configuration information of the second radio signal, the group of configuration information being comprised of at least one of time-frequency resources occupied, an MCS, a HARQ process ID or a New Data Indicator (NDI); the first information is used to determine whether the second radio signal is correctly received, or the second radio signal is a reference signal and the first information is Channel State Information (CSI) for the reference signal.

According to one aspect of the present disclosure, the above method is characterized in that the first radio signal corresponds to a first type, and the second radio signal corresponds to a second type, the first condition set being comprised of the first type and the second type.

In one embodiment, an advantage of the above method lies in associating the selection of beta_Offset parameter set with a type corresponding to a first radio signal and a type corresponding to a second radio signal; with the performance demands of the first radio signal and the second radio signal varying, the previously provided beta_Offset parameter set will have to be updated.

According to one aspect of the present disclosure, the above method is characterized in comprising:
  receiving second information;
  herein, the second information is used to indicate L1 first-type parameter groups, the L1 first-type parameter groups include a first parameter group, and the first parameter group comprises the K1 parameter sets; the first condition set is used to determine the first parameter group out of the L1 first-type parameter groups.

According to one aspect of the present disclosure, the above method is characterized in that a scrambling sequence employed by Cyclic Redundancy Check (CRC) comprised in the first signaling is generated by a specific identifier, the specific identifier being used to determine the first parameter group comprising the K1 parameter sets out of the L1 first-type parameter groups.

The present disclosure provides a method in a second node for wireless communications, comprising:
  transmitting a first signaling; and
  receiving a first radio signal and first information in a first time-frequency resource set;
  herein, the first signaling is used to determine the first time-frequency resource set, and the first signaling comprises a first field, the first field comprised in the first signaling being used to determine a first parameter set out of K1 parameter sets, the first parameter set comprises K2 first-type parameters, and at least one of the K2 first-type parameters is used to determine a first integer, a number of resource elements occupied by the first information in the first time-frequency resource set is equal to the first integer, the first integer being greater than 0; the K1 parameter sets are related to a first condition set; K1 and K2 are positive integers greater than 1, respectively.

According to one aspect of the present disclosure, the above method is characterized in that the first radio signal comprises M1 radio sub-signals, and time-domain resources occupied by any two of the M1 radio sub-signals are orthogonal, each of the M1 radio sub-signals is generated by a first bit block, and the first condition set comprises a value of M1, M1 being a positive integer greater than 1.

According to one aspect of the present disclosure, the above method is characterized in that a Modulation and Coding Scheme (MCS) adopted by the first radio signal belongs to a first MCS set, and the first condition set comprises the first MCS set.

According to one aspect of the present disclosure, the above method is characterized in that time-frequency resources occupied by the first signaling belong to a candidate time-frequency resource set, and the first condition set comprises the candidate time-frequency resource set.

According to one aspect of the present disclosure, the above method is characterized in that time-domain resources occupied by the first signaling belong to a first time unit, while time-domain resources occupied by the first radio signal starts with a second time unit, the second time unit being a T-th time unit after the first time unit, T being a non-negative integer, and the first condition set comprises a value of T.

According to one aspect of the present disclosure, the above method is characterized in comprising:
  transmitting a second signaling and a second radio signal;
  herein, the second signaling comprises a group of configuration information of the second radio signal, the group of configuration information being comprised of at least one of time-frequency resources occupied, an MCS, a HARQ process ID or a New Data Indicator (NDI); the first information is used to determine whether the second radio signal is correctly received, or the second radio signal is a reference signal and the first information is Channel State Information (CSI) for the reference signal.

According to one aspect of the present disclosure, the above method is characterized in that the first radio signal corresponds to a first type, and the second radio signal corresponds to a second type, the first condition set being comprised of the first type and the second type.

According to one aspect of the present disclosure, the above method is characterized in comprising:

transmitting second information;

herein, the second information is used to indicate L1 first-type parameter groups, the L1 first-type parameter groups include a first parameter group, and the first parameter group comprises the K1 parameter sets; the first condition set is used to determine the first parameter group out of the L1 first-type parameter groups.

According to one aspect of the present disclosure, the above method is characterized in that a scrambling sequence employed by CRC comprised in the first signaling is generated by a specific identifier, the specific identifier being used to determine the first parameter group comprising the K1 parameter sets out of the L1 first-type parameter groups.

The present disclosure provides a first node for wireless communications, comprising:

a first receiver, receiving a first signaling;

a first transmitter, transmitting a first radio signal and first information in a first time-frequency resource set;

herein, the first signaling is used to determine the first time-frequency resource set, and the first signaling comprises a first field, the first field comprised in the first signaling being used to determine a first parameter set out of K1 parameter sets, the first parameter set comprises K2 first-type parameters, and at least one of the K2 first-type parameters is used to determine a first integer, a number of resource elements occupied by the first information in the first time-frequency resource set is equal to the first integer, the first integer being greater than 0; the K1 parameter sets are related to a first condition set; K1 and K2 are positive integers greater than 1, respectively.

The present disclosure provides a second node for wireless communications, comprising:

a second transmitter, transmitting a first signaling; and a second receiver, receiving a first radio signal and first information in a first time-frequency resource set;

herein, the first signaling is used to determine the first time-frequency resource set, and the first signaling comprises a first field, the first field comprised in the first signaling being used to determine a first parameter set out of K1 parameter sets, the first parameter set comprises K2 first-type parameters, and at least one of the K2 first-type parameters is used to determine a first integer, a number of resource elements occupied by the first information in the first time-frequency resource set is equal to the first integer, the first integer being greater than 0; the K1 parameter sets are related to a first condition set; K1 and K2 are positive integers greater than 1, respectively.

In one embodiment, the present disclosure has the following advantages compared with the prior art:

when performance demand of UCI piggybacked to a PUSCH differs a lot from that of the PUSCH itself, e.g., the performance of UCI has higher performance demand than the PUSCH (that is, UCI is a HARQ-ACK in URLLC, while the PUSCH is data in eMBB), or, the performance of UCI has lower performance demand than the PUSCH (that is, UCI is CSI, while the PUSCH is data having been transmitted for multiple times); the present disclosure adjusts the value range of a Beta_Offset according to a first condition set, thus enhancing the UCI transmission performance and spectrum efficiency.

the UE will perform eMBB and URLLC transmissions simultaneously. Targeting scenarios in which different kinds of UCI are piggybacked in a PUSCH, the UE is required to dynamically select different Beta_offsets, given that 4 values indicated by the current DCI still cannot satisfy a dynamic variation range of multiple scenarios, the method above can play a role in enhancing the effect of dynamic selection range of Beta_Offset without increasing the number of bits in DCI.

BRIEF DESCRIPTION OF THE DRAWINGS

Other features, objects and advantages of the present disclosure will become more apparent from the detailed description of non-restrictive embodiments taken in conjunction with the following drawings:

FIG. 6 illustrates a schematic diagram of K1 parameter sets according to one embodiment of the present disclosure.

FIG. 7 illustrates a schematic diagram of L1 parameter groups according to one embodiment of the present disclosure.

FIG. 8 illustrates a schematic diagram of a first radio signal and first information according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
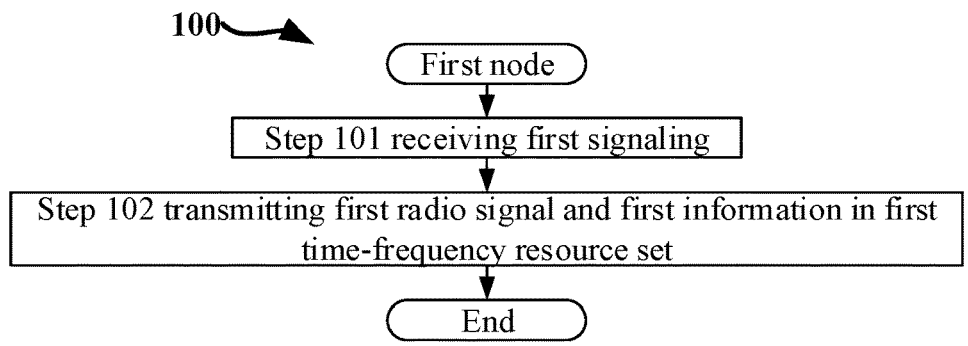
FIG. 1 illustrates a flowchart of processing of a first node according to one embodiment of the present disclosure.

Embodiment 1 illustrates a flowchart of processing of a first node, as shown in FIG. 1. In 100 illustrated by FIG. 1, each box represents a step. In Embodiment 1, a first node in the present disclosure receives a first signaling in step 101, and transmits a first radio signal and first information in a first time-frequency resource set in step 102.

In Embodiment 1, the first signaling is used to determine the first time-frequency resource set, and the first signaling comprises a first field, the first field comprised in the first signaling being used to determine a first parameter set out of K1 parameter sets, the first parameter set comprises K2 first-type parameters, and at least one of the K2 first-type parameters is used to determine a first integer, a number of resource elements occupied by the first information in the first time-frequency resource set is equal to the first integer, the first integer being greater than 0; the K1 parameter sets are related to a first condition set; K1 and K2 are positive integers greater than 1, respectively.

In one embodiment, the K1 parameter sets belong to a first parameter group, the first parameter group is one of L1 first-type parameter groups, and the first condition set is used to determine the first parameter group out of the L1 first-type parameter groups; L1 is a positive integer greater than 1.

In one embodiment, K1 is equal to 4.

In one embodiment, the first field comprises 2 bits.

In one embodiment, any parameter set of K1 parameter sets comprises K2 parameters, K2 being a positive integer greater than 1.

In one subembodiment, K2 is equal to 7.

In one subembodiment, the K2 parameters include 3 parameters, and the parameters are respectively used for a HARQ-ACK information bit with no more than 2 digits, a HARQ-ACK information bit with more than 2 and no more than 11 digits and a HARQ-ACK information bit with more than 11 digits comprised in the first information.

In one subembodiment, the K2 parameters include 2 parameters, and the 2 parameters are respectively used for Part 1 CSI Reports or Part 2 CSI reports comprising no more than 11 bits in the first information.

In one subembodiment, the K2 parameters include 2 parameters, and the 2 parameters are respectively used for Part 1 CSI Reports or Part 2 CSI reports comprising more than 11 bits in the first information.

In one subembodiment, K2 is equal to 7, the K2 parameters respectively including:
 betaOffsetACK-Index1;
 betaOffsetACK-Index2;
 betaOffsetACK-Index3;
 betaOffsetCSI-Part1-Index1;
 betaOffsetCSI-Part1-Index2;
 betaOffsetCSI-Part2-Index1;
 betaOffsetCSI-Part2-Index2.

In one embodiment, the first signaling is a piece of DCI.

In one embodiment, the first signaling is an Uplink Grant (UL Grant).

In one embodiment, a physical layer channel occupied by the first radio signal comprises a PUSCH.

In one embodiment, the first signaling schedules the first radio signal.

In one embodiment, the first information is a piece of Uplink Control Information (UCI).

In one embodiment, the first information comprises at least one of HARQ-ACK, CSI Part 1 or CSI Part 2.

In one subembodiment, a number of bits in a HARQ-ACK comprised in the first information is no greater than 2, and a betaOffsetACK-Index1 in the K2 first-type parameters is used to determine the first integer.

In one subembodiment, the number of bits in a HARQ-ACK comprised in the first information is greater than 2 and no greater than 11, and a betaOffsetACK-Index2 in the K2 first-type parameters is used to determine the first integer.

In one subembodiment, the number of bits in a HARQ-ACK comprised in the first information is greater than 11, and a betaOffsetACK-Index3 in the K2 first-type parameters is used to determine the first integer.

In one subsidiary embodiment of the above three subembodiments, the method of determining the first integer refers to section 6.3.2.4.1.1 of TS 38.212, where the first integer corresponds to $Q_{ACK}'$, and a first-type parameter used to determine the first integer corresponds to $\beta_{Offset}^{PUSCH}$.

In one subembodiment, the number of bits in a CSI Part comprised by the first information is no greater than 11, a betaOffsetCSI-Part1-Index1 and a betaOffsetCSI-Part2-Index1 in the K2 first-type parameters are respectively used to determine a second integer and a third integer, the second integer being the number of REs occupied by the CSI Part 1 and the third integer being the number of REs occupied by the CSI Part 2, and a sum of the second integer and the third integer being used to determine the first integer.

In one subembodiment, the number of bits in a CSI Part comprised by the first information is greater than 11, a betaOffsetCSI-Part1-Index2 and a betaOffsetCSI-Part2-Index2 in the K2 first-type parameters are respectively used to determine a second integer and a third integer, the second integer being the number of REs occupied by the CSI Part 1 and the third integer being the number of REs occupied by the CSI Part 2, and a sum of the second integer and the third integer being used to determine the first integer.

In one subsidiary embodiment of the above three subembodiments, the method of determining the second integer refers to section 6.3.2.4.1.2 of TS 38.212, where the first integer corresponds to $Q_{CSI-1}'$, and a first-type parameter used to determine the first integer corresponds to $\beta_{Offset}^{PUSCH}$.

In one subsidiary embodiment of the above three subembodiments, the method of determining the third integer refers to section 6.3.2.4.1.3 of TS 38.212, where the first integer corresponds to $Q_{CSI-2}'$, and a first-type parameter used to determine the first integer corresponds $\beta_{Offset}^{PUSCH}$.

In one embodiment, the first information is piggybacked into the first radio signal.

In one embodiment, the first information is multiplexed in the first radio signal.

In one embodiment, the first information comprises a HARQ-ACK, the HARQ-ACK being mapped in the first time-frequency resource set through puncturing.

In one embodiment, the first information comprises CSI, the CSI being mapped in the first time-frequency resource set through Rate-Matching.

Embodiment 2

Figure 2:
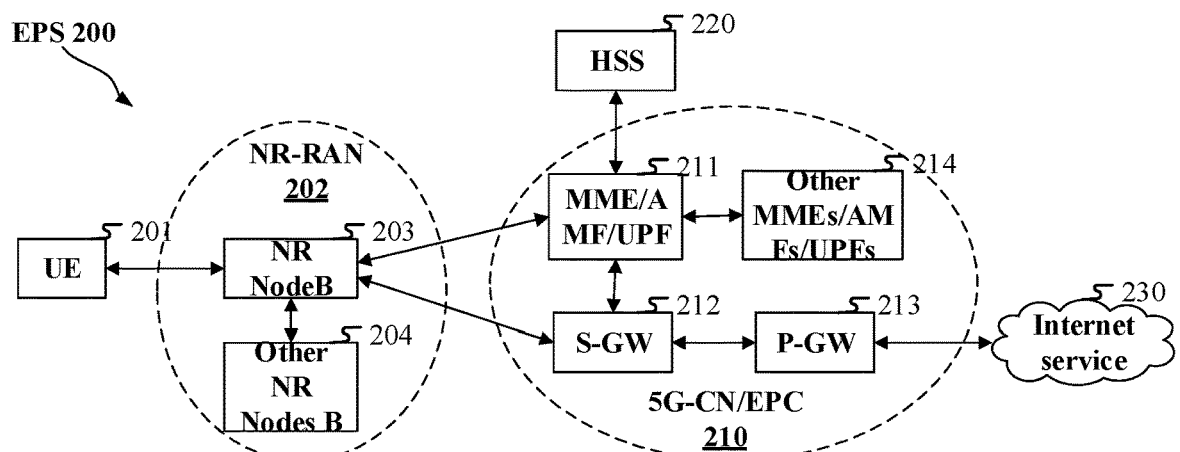
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of NR 5G, Long-Term Evolution (LTE), and Long-Term Evolution Advanced (LTE-A) systems. The NR 5G or LTE network architecture 200 may be called an Evolved Packet System (EPS) 200, which may comprise one or more UEs 201, an NG-RAN 202, an Evolved Packet Core/5G Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the UE 201 corresponds to the first node in the present disclosure, and the gNB 203 corresponds to the second node in the present disclosure.

In one embodiment, the gNB 203 supports Repetition-based transmission.

In one embodiment, the UE 201 supports Repetition-based transmission.

In one embodiment, the gNB 203 supports eMBB and URLLC traffics at the same time.

In one embodiment, the UE 201 supports eMBB and URLLC traffics at the same time.

Embodiment 3

Figure 3:
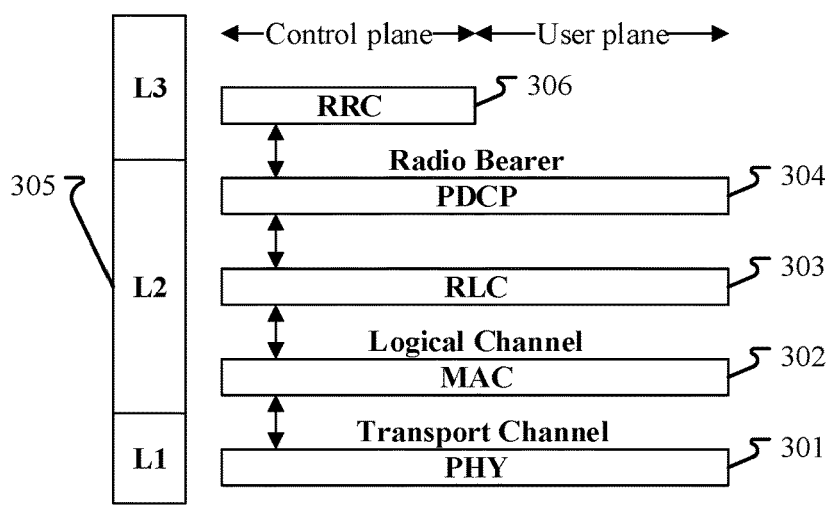
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3. FIG. 3 is a schematic diagram of an example of the radio protocol architecture used for a user plane and a control plane. In FIG. 3, the radio protocol architecture for a first node and a second node is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first node and the second node via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the second nodes of the network side. Although not described in FIG. 3, the first node may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between second nodes. The RLC sublayer 303 provides segmentation and reassembling of a higher-layer packet, retransmission of a lost packet, and reordering of a packet so as to compensate disordered receiving caused by HARQ. The MAC sublayer 302 provides multiplexing between a logical channel and a transport channel. The MAC sublayer 302 is also responsible for allocating between first nodes various radio resources (i.e., resource blocks) in a cell. The MAC sublayer 302 is also in charge of HARQ operation. In the control plane, the radio protocol architecture of the first node and the second node is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the second node and the first node.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signaling in the present disclosure is generated by the PHY 301.

In one embodiment, the first radio signal in the present disclosure is generated by the PHY 301.

In one embodiment, the first radio signal in the present disclosure is generated by the MAC sublayer 302.

In one embodiment, the first information in the present disclosure is generated by the PHY 301.

In one embodiment, the first information in the present disclosure is generated by the MAC sublayer 302.

In one embodiment, the second signaling in the present disclosure is generated by the PHY 301.

In one embodiment, the second radio signal in the present disclosure is generated by the PHY 301.

In one embodiment, the second radio signal in the present disclosure is generated by the MAC sublayer 302.

In one embodiment, the second information in the present disclosure is generated by the RRC sublayer 306.

Embodiment 4

Figure 4:
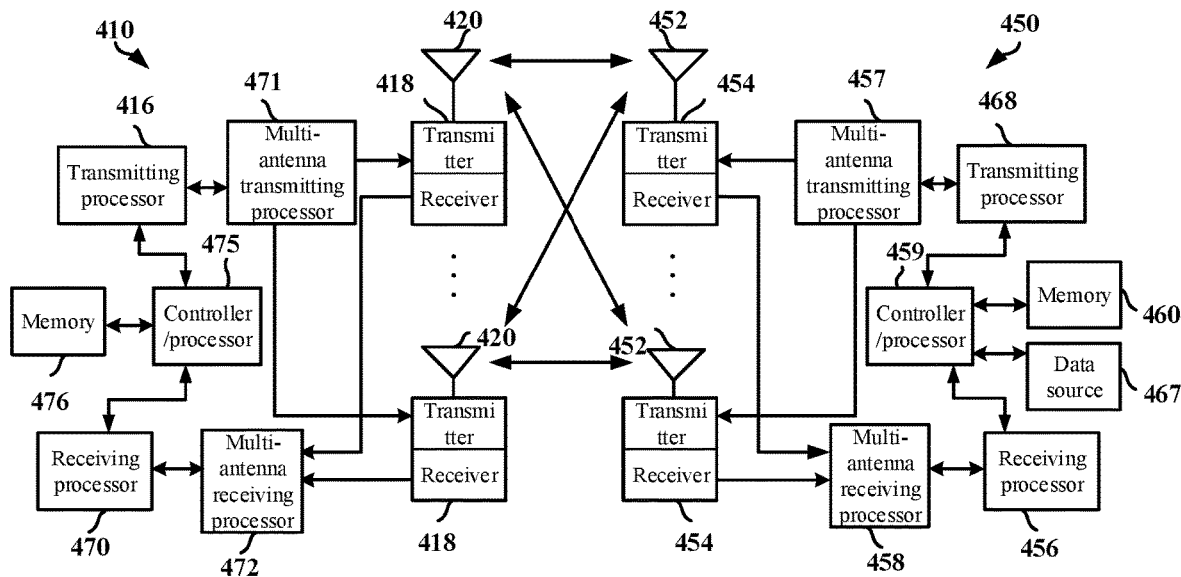
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 implements the functionality of the L2 layer. In the transmission from the second communication device 410 to the first communication device 450, the controller/processor 475 provides header compression, encryption, packet segmentation and reordering, multiplexing between a logical channel and a transport channel and radio resource allocation of the first communication device 450 based on various priorities. The controller/processor 475 is also in charge of a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK, QPSK, M-PSK, and M-QAM, etc.). The multi-antenna transmitting processor 471 performs digital spatial precoding, including codebook-based precoding and non-codebook-based precoding, and beamforming processing on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to antennas 420.

In a transmission from the second communication device 410 to the first communication device 450, at the first communication device 450, each receiver 454 receives a signal via a corresponding antenna 452. Each receiver 454 recovers information modulated onto the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In the transmission from the second communication device 410 to the first communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including codebook-based precoding and non-codebook-based precoding, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor. The first communication device 450 at least receives a first signaling, and transmits a first radio signal and first information in a first time-frequency resource set; the first signaling is used to determine the first time-frequency resource set, and the first signaling comprises a first field, the first field comprised in the first signaling being used to determine a first parameter set out of K1 parameter sets, the first parameter set comprises K2 first-type parameters, and at least one of the K2 first-type parameters is used to determine a first integer, a number of resource elements occupied by the first information in the first time-frequency resource set is equal to the first integer, the first integer being greater than 0; the K1 parameter sets are related to a first condition set; K1 and K2 are positive integers greater than 1, respectively.

In one embodiment, the first communication device 450 comprises a memory that stores a computer readable instruction program. The computer readable instruction program generates actions when executed by at least one processor. The actions include: receiving a first signaling, and transmitting a first radio signal and first information in a first time-frequency resource set; the first signaling is used to determine the first time-frequency resource set, and the first signaling comprises a first field, the first field comprised in the first signaling being used to determine a first parameter set out of K1 parameter sets, the first parameter set comprises K2 first-type parameters, and at least one of the K2 first-type parameters is used to determine a first integer, a number of resource elements occupied by the first information in the first time-frequency resource set is equal to the first integer, the first integer being greater than 0; the K1 parameter sets are related to a first condition set; K1 and K2 are positive integers greater than 1, respectively.

In one embodiment, the second communication device 410 comprises at least one processor and at least one memory. The at least one memory comprises computer program codes. The at least one memory and the computer program codes are configured to be used in collaboration with the at least one processor. The second communication device 410 at least transmits a first signaling, and receives a first radio signal and first information in a first time-frequency resource set; the first signaling is used to determine the first time-frequency resource set, and the first signaling comprises a first field, the first field comprised in the first signaling being used to determine a first parameter set out of K1 parameter sets, the first parameter set comprises K2 first-type parameters, and at least one of the K2 first-type parameters is used to determine a first integer, a number of resource elements occupied by the first information in the first time-frequency resource set is equal to the first integer, the first integer being greater than 0; the K1 parameter sets are related to a first condition set; K1 and K2 are positive integers greater than 1, respectively.

In one embodiment, the second communication device 410 comprises a memory that stores a computer readable instruction program. The computer readable instruction program generates actions when executed by at least one processor. The actions include: transmitting a first signaling, and receiving a first radio signal and first information in a first time-frequency resource set; the first signaling is used to determine the first time-frequency resource set, and the first signaling comprises a first field, the first field comprised in the first signaling being used to determine a first parameter set out of K1 parameter sets, the first parameter set comprises K2 first-type parameters, and at least one of the K2 first-type parameters is used to determine a first integer, a number of resource elements occupied by the first information in the first time-frequency resource set is equal to the first integer, the first integer being greater than 0; the K1 parameter sets are related to a first condition set; K1 and K2 are positive integers greater than 1, respectively.

In one embodiment, the first communication device 450 corresponds to the first node in the present disclosure.

In one embodiment, the second communication device 410 corresponds to the second node in the present disclosure.

In one embodiment, the first communication device 450 is a UE.

In one embodiment, the second communication device 410 is a base station.

In one embodiment, at least one of the antenna 452, the receiver 454, the multi-antenna receiving processor 458, the receiving processor 456 or the controller/processor 459 is used for receiving a first signaling; at least one of the antenna 420, the transmitter 418, the multi-antenna transmitting processor 471, the transmitting processor 416 or the controller/processor 475 is used for transmitting a first signaling.

In one embodiment, at least one of the antenna 452, the transmitter 454, the multi-antenna transmitting processor 457, the transmitting processor 468 or the controller/processor 459 is used for transmitting a first radio signal and first information in a first time-frequency resource set; at least one of the antenna 420, the receiver 418, the multi-antenna receiving processor 472, the receiving processor 470 or the controller/processor 475 is used for receiving a first radio signal and first information in a first time-frequency resource set.

In one embodiment, at least one of the antenna 452, the receiver 454, the multi-antenna receiving processor 458, the receiving processor 456 or the controller/processor 459 is used for receiving a second signaling and a second radio signal; at least one of the antenna 420, the transmitter 418, the multi-antenna transmitting processor 471, the transmitting processor 416 or the controller/processor 475 is used for transmitting a second signaling and a second radio signal.

In one embodiment, at least one of the antenna 452, the receiver 454, the multi-antenna receiving processor 458, the receiving processor 456 or the controller/processor 459 is used for receiving second information; at least one of the antenna 420, the transmitter 418, the multi-antenna transmitting processor 471, the transmitting processor 416 or the controller/processor 475 is used for transmitting second information.

Embodiment 5

Figure 5:
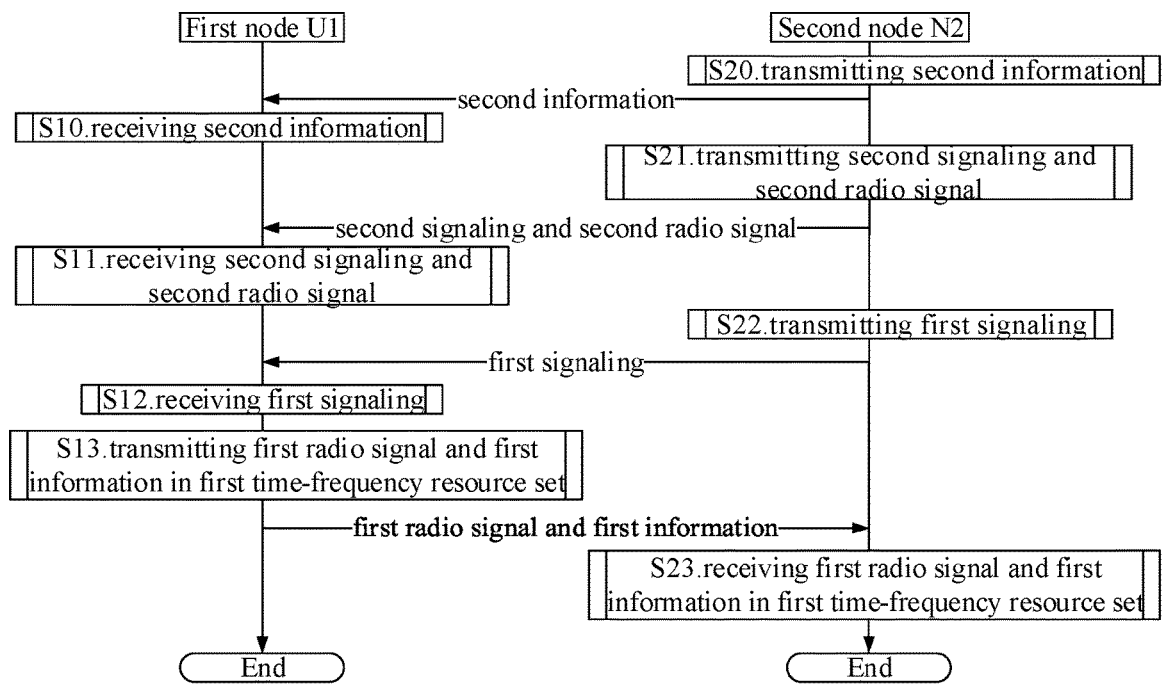
FIG. 5 illustrates a flowchart of first information according to one embodiment of the present disclosure.

Embodiment 5 illustrates a flowchart of first information, as shown in FIG. 5. In FIG. 5, a first node U1 and a second node N2 are in wireless communications.

The first node U1 receives second information in step S10, and receives a second signaling and a second radio signal in step S11, receives a first signaling in step S12, and transmits a first radio signal and first information in a first time-frequency resource set in step S13.

The second node N2 transmits second information in step S20, and transmits a second signaling and a second radio signal in step S21, transmits a first signaling in step S22, and receives a first radio signal and first information in a first time-frequency resource set in step S23.

In Embodiment 5, the first signaling is used to determine the first time-frequency resource set, and the first signaling comprises a first field, the first field comprised in the first signaling being used to determine a first parameter set out of K1 parameter sets, the first parameter set comprises K2 first-type parameters, and at least one of the K2 first-type parameters is used to determine a first integer, a number of resource elements occupied by the first information in the first time-frequency resource set is equal to the first integer, the first integer being greater than 0; the K1 parameter sets are related to a first condition set; K1 and K2 are positive integers greater than 1, respectively; the second signaling comprises a group of configuration information of the second radio signal, the group of configuration information being comprised of at least one of time-frequency resources occupied, an MCS, a HARQ process ID or a New Data Indicator (NDI); the first information is used to determine whether the second radio signal is correctly received, or the second radio signal is a reference signal and the first information is Channel State Information (CSI) for the reference signal; the second information is used to indicate L1 first-type parameter groups, the L1 first-type parameter groups include a first parameter group, and the first parameter group comprises the K1 parameter sets; the first condition set is used to determine the first parameter group out of the L1 first-type parameter groups.

In one embodiment, the first radio signal comprises M1 radio sub-signals, and time-domain resources occupied by any two of the M1 radio sub-signals are orthogonal, each of the M1 radio sub-signals is generated by a first bit block, and the first condition set comprises a value of M1, M1 being a positive integer greater than 1.

In one subembodiment, the phrase that time-domain resources occupied by any two of the M1 radio sub-signals are orthogonal comprises: there isn't an OFDM symbol belonging to two radio sub-signals of the M1 radio sub-signals.

In one subembodiment, the M1 radio sub-signals are M1 repetitions for the first bit block.

In one subembodiment, the M1 radio sub-signals respectively occupy M1 time units.

In one subsidiary embodiment of the above subembodiment, any of the M1 time units is a slot, or any of the M1 time units is a mini-slot, or any of the M1 time units is an OFDM symbol.

In one subembodiment, the phrase that the first condition set comprises a value of M1 comprises: the value of M1 is used for determining a parameter group comprising the K1 parameter sets out of the L1 parameter groups in the present disclosure; L1 being a positive integer greater than 1.

In one subsidiary embodiment of the above subembodiment, the M1 is an integer in a first candidate integer set, the first candidate integer set comprising L1 integers, the L1 integers corresponding to the L1 parameter groups respectively.

In one subsidiary embodiment of the above subembodiment, the M1 belongs to a first-type candidate integer interval of L1 first-type candidate integer intervals, the L1 first-type candidate integer intervals corresponding to the L1 parameter groups respectively, and the first-type candidate integer interval to which the M1 belongs is used for determining a parameter group out of the L1 parameter groups.

In one subembodiment, an MCS employed by the first radio signal belongs to a first MCS set, and the first condition set comprises the first MCS set.

In one subembodiment, the phrase that the first condition set comprises the first MCS set comprises: the first MCS set is one of L1 MCS sets, the L1 MCS sets respectively corresponding to the L1 parameter groups in the present disclosure, and the first MCS set is used for determining a first parameter group out of the L1 parameter groups, the first parameter group comprising the K1 parameter sets.

In one embodiment, time-frequency resources occupied by the first signaling belong to a candidate time-frequency resource set, and the first condition set comprises the candidate time-frequency resource set.

In one subembodiment, the phrase that the first condition set comprises the candidate time-frequency resource set comprises: the candidate time-frequency resource set is one of L1 first-type time-frequency resource sets, the L1 first-type time-frequency resource sets respectively corresponding to the L1 parameter groups in the present disclosure, and the candidate time-frequency resource set is used for determining a parameter group comprising the K1 parameter sets out of the L1 parameter groups.

In one subsidiary embodiment of the above subembodiment, the L1 first-type time-frequency resource sets are L1 Control Resource Sets (CORESETs) respectively.

In one subsidiary embodiment of the above subembodiment, the L1 first-type time-frequency resource sets are L1 search spaces respectively.

In one subembodiment, the candidate time-frequency resource set is a first candidate time-frequency resource set of a first candidate time-frequency resource set and a second candidate time-frequency resource set, and the K1 parameter sets belong to a first candidate parameter group; or, the candidate time-frequency resource set is a second candidate time-frequency resource set of a first candidate time-frequency resource set and a second candidate time-frequency resource set, and the K1 parameter sets belong to a second candidate parameter group.

In one subsidiary embodiment of the above subembodiment, the first candidate time-frequency resource set is a CORESET allocated for URLLC, and the second candidate time-frequency resource set is a CORESET allocated for eMBB.

In one subsidiary embodiment of the above subembodiment, the first candidate time-frequency resource set is a search space allocated for URLLC, and the second candidate time-frequency resource set is a search space allocated for eMBB.

In one subsidiary embodiment of the above subembodiment, the first candidate parameter group is different from the second candidate parameter group.

In one embodiment, time-domain resources occupied by the first signaling belong to a first time unit, while time-domain resources occupied by the first radio signal starts with a second time unit, the second time unit being a T-th time unit after the first time unit, T being a non-negative integer, and the first condition set comprises a value of T.

In one subembodiment, the first time unit is a slot, or the first time unit is a subframe, or the first time unit is a mini-slot, or the first time unit is an OFDM symbol.

In one subembodiment, the second time unit is a slot, or the second time unit is a subframe, or the second time unit is a mini-slot, or the second time unit is an OFDM symbol.

In one subembodiment, the phrase of the second time unit being a T-th time unit after the first time unit comprises that an index for the first time unit is #n, and an index for the second time unit is #(n+T).

In one subembodiment, time-domain resources occupied by the first radio signal are the second time unit.

In one subembodiment, time-domain resources occupied by the first radio signal comprise multiple time units, and the second time unit is an earliest time unit in time domain among the multiple time units.

In one subembodiment, the phrase that the first condition set comprises a value of T comprises that the value of T is used for determining a parameter group comprising the K1 parameter sets out of the L1 parameter groups.

In one subsidiary embodiment of the above subembodiment, the M1 is an integer in a second candidate integer set, the second candidate integer set comprising L1 integers, the L1 integers corresponding to the L1 parameter groups respectively.

In one subsidiary embodiment of the above subembodiment, the M1 belongs to a second-type candidate integer interval of L1 second-type candidate integer intervals, the L1 second-type candidate integer intervals corresponding to the L1 parameter groups respectively, and the second-type candidate integer interval to which the M1 belongs is used for determining a parameter group out of the L1 parameter groups.

In one embodiment, the second signaling is a piece of DCI.

In one embodiment, the second signaling is a DL Grant.

In one embodiment, a physical layer channel occupied by the second radio signal comprises a Physical Downlink Shared Channel (PDSCH).

In one embodiment, a transport channel occupied by the second radio signal comprises a Downlink Shared Channel (DL-SCH).

In one embodiment, the second signaling is used for scheduling the second radio signal.

In one embodiment, the first information is a HARQ-ACK for the second radio signal.

In one embodiment, the second signaling is used for triggering a CSI report.

In one embodiment, the second signaling is an RRC signaling.

In one embodiment, the second radio signal is a CSI-RS.

In one embodiment, the second radio signal is a Demodulation Reference Signal (DMRS).

In one embodiment, the first information is obtained by a measurement on the second radio signal.

In one embodiment, the first information comprises at least one of Channel Quality Information (CQI), a Precoding Matrix Indicator (PMI), a CSI-RS Resource Indicator (CRI), a SS/PBCH Resource Block Indicator (SSBRI), a Layer Indicator (LI), a Rank Indicator (RI) or a Reference Signal Received Power (RSRP).

In one embodiment, the first type is URLLC, or the first type is eMBB.

In one embodiment, the phrase that the first radio signal corresponds to a first type means that the first radio signal is a radio signal in URLLC, or the first radio signal is a radio signal in eMBB.

In one embodiment, the second type is URLLC, or the second type is eMBB.

In one embodiment, the phrase that the second radio signal corresponds to a second type means that the second radio signal is a radio signal in URLLC, or the second radio signal is a radio signal in eMBB.

In one embodiment, the phrase of the first condition set being comprised of the first type and the second type means that the K1 parameter sets belong to a first parameter group, the first parameter group is one of L1 first-type parameter groups, and the first type and the second type are used for determining the first parameter group out of the L1 first-type parameter groups.

In one subembodiment, both the first type and the second type are URLLC, and the first parameter group is a first-type parameter group #1 among the L1 first-type parameter groups.

In one subembodiment, the first type is eMBB and the second type is URLLC, and the first parameter group is a first-type parameter group #2 among the L1 first-type parameter groups.

In one subembodiment, both the first type and the second type are eMBB, and the first parameter group is a first-type parameter group #3 among the L1 first-type parameter groups.

In one subembodiment, the first type is URLLC and the second type is eMBB, and the first parameter group is a first-type parameter group #4 among the L1 first-type parameter groups.

In one embodiment, the second information is an RRC signaling.

In one embodiment, the second information is a higher layer signaling.

In one embodiment, any first-type parameter group of the L1 first-type parameter groups corresponds to an identifier.

In one embodiment, a scrambling sequence employed by CRC comprised by the first signaling is generated by a specific identifier, and the specific identifier is used to determine the first parameter group comprising the K1 parameter sets out of the L1 first-type parameter groups.

In one subembodiment, the specific identifier is a Radio Network Temporary Identifier (RNTI).

In one subembodiment, the specific identifier belongs to a first identifier group, the first identifier group is one of L1 first-type identifier groups, the L1 first-type identifier groups respectively correspond to the L1 first-type parameter groups in the present disclosure, and the first identifier group is used for determining the first parameter group comprising the K1 parameter sets out of the L1 first-type parameter groups.

In one subsidiary embodiment of the above subembodiment, any of the L1 first-type identifier groups comprises at least one identifier.

In one subsidiary embodiment of the above subembodiment, each identifier comprised in any of the L1 first-type identifier groups is an integer.

In one subsidiary embodiment of the above subembodiment, each identifier comprised in any of the L1 first-type identifier groups is an RNTI.

In one subembodiment, the specific identifier is one of L1 candidate identifiers, the L1 candidate identifiers respectively correspond to the L1 first-type parameter groups in the present disclosure, and the specific identifier is used for determining the first parameter group comprising the K1 parameter sets out of the L1 first-type parameter groups.

In one subsidiary embodiment of the above subembodiment, any candidate identifier of the L1 candidate identifiers is an integer.

In one subsidiary embodiment of the above subembodiment, any candidate identifier of the L1 candidate identifiers is a RNTI.

Embodiment 6

Embodiment 6 illustrates a schematic diagram of K1 parameter sets, as shown in FIG. 6. In FIG. 6, K1 is equal to 4, the K1 parameter sets are associated with a parameter group identifier, and the parameter group identifier is used for identifying a parameter group to which the K1 parameter sets belong among the L1 parameter groups. The K1 parameter sets in FIG. 6 respectively correspond to parameter set #1-parameter set #4 illustrated in this figure; and the parameter set #1-parameter set #4 correspond to a first field respectively being equal to "00", "01", "10" and "11".

In one embodiment, the K1 parameter sets respectively correspond to K1 parameter set identifiers, the first field in the first signaling is used for indicating a parameter set identifier among the K1 parameter set identifiers, and the indicated parameter set identifier is used by the first node for determining the first parameter set.

In one embodiment, the K1 parameter sets are placed in corresponding RRC signalings in sequence.

In one embodiment, the K1 parameter sets are configured by CG-UCI-OnPUSCH given in TS 38.331.

In one embodiment, the K1 parameter sets are configured by UCI-OnPUSCH given in TS 38.331.

In one embodiment, any of the K1 parameter sets corresponds to configuration of BetaOffsets given in TS 38.331.

Embodiment 7

Embodiment 7 illustrates a schematic diagram of L1 parameter groups. As illustrated in FIG. 7, the parameter group #1-parameter group #L1 respectively correspond to L1 parameter groups; any of the L1 parameter groups comprises 4 parameter sets, the 4 parameter sets corresponding to four values of the first field, respectively.

In one embodiment, the L1 parameter groups respectively correspond to L1 different parameter group identifiers.

In one embodiment, the L1 parameter groups are configured by CG-UCI-OnPUSCH given in TS 38.331.

In one embodiment, the L1 parameter groups are configured by UCI-OnPUSCH given in TS 38.331.

Embodiment 8

Embodiment 8 illustrates a schematic diagram of a first radio signal and first information, as shown in FIG. 8. In FIG. 8, the first radio signal occupies at least one OFDM symbol in time domain and frequency-domain resources corresponding to at least one Physical Resource Block (PRB) in frequency domain.

In one embodiment, information bits corresponding to the first information are mapped into time-frequency resources occupied by the first radio signal through puncturing.

In one embodiment, information bits corresponding to the first information are mapped into time-frequency resources occupied by the first radio signal through rate matching.

In one embodiment, the first information is mapped into time-frequency resources occupied by the first radio signal in frequency domain in an ascending order of frequency.

In one embodiment, the first information is mapped into time-frequency resources occupied by the first radio signal in time domain in an order that OFDM symbols nearest to DMRS are firstly mapped.

In one embodiment, the first radio signal comprises M1 radio sub-signals, and information bits occupied by the first information are evenly mapped into the M1 radio sub-signals.

Embodiment 9

Figure 9:
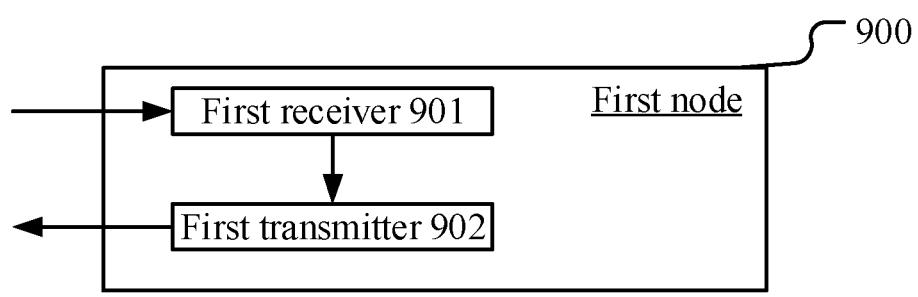
FIG. 9 illustrates a structure block diagram in a first node according to one embodiment of the present disclosure.

Embodiment 9 illustrates a structure block diagram in a first node, as shown in FIG. 9. In FIG. 9, a first node 900 comprises a first receiver 901 and a first transmitter 902.

The first receiver 901 receives a first signaling;

the first transmitter 902 transmits a first radio signal and first information in a first time-frequency resource set.

In Embodiment 9, the first signaling is used to determine the first time-frequency resource set, and the first signaling comprises a first field, the first field comprised in the first signaling being used to determine a first parameter set out of K1 parameter sets, the first parameter set comprises K2 first-type parameters, and at least one of the K2 first-type parameters is used to determine a first integer, a number of resource elements occupied by the first information in the first time-frequency resource set is equal to the first integer, the first integer being greater than 0; the K1 parameter sets are related to a first condition set; K1 and K2 are positive integers greater than 1, respectively.

In one embodiment, the first radio signal comprises M1 radio sub-signals, and time-domain resources occupied by any two of the M1 radio sub-signals are orthogonal, each of the M1 radio sub-signals is generated by a first bit block, and the first condition set comprises a value of M1, M1 being a positive integer greater than 1.

In one embodiment, an MCS employed by the first radio signal belongs to a first MCS set, and the first condition set comprises the first MCS set.

In one embodiment, time-frequency resources occupied by the first signaling belong to a candidate time-frequency resource set, and the first condition set comprises the candidate time-frequency resource set.

In one embodiment, time-domain resources occupied by the first signaling belong to a first time unit, while time-domain resources occupied by the first radio signal starts with a second time unit, the second time unit being a T-th time unit after the first time unit, T being a non-negative integer, and the first condition set comprises a value of T.

In one embodiment, the first receiver 901 receives a second signaling and a second radio signal; the second signaling comprises a group of configuration information of the second radio signal, the group of configuration information being comprised of at least one of time-frequency resources occupied, an MCS, a HARQ process ID or a New Data Indicator (NDI); the first information is used to determine whether the second radio signal is correctly received, or the second radio signal is a reference signal and the first information is Channel State Information (CSI) for the reference signal.

In one embodiment, the first radio signal corresponds to a first type, and the second radio signal corresponds to a second type, the first condition set being comprised of the first type and the second type.

In one embodiment, the first receiver 901 receives second information; the second information is used to indicate L1 first-type parameter groups, the L1 first-type parameter groups include a first parameter group, and the first parameter group comprises the K1 parameter sets; the first condition set is used to determine the first parameter group out of the L1 first-type parameter groups.

In one embodiment, a scrambling sequence employed by CRC comprised by the first signaling is generated by a specific identifier, and the specific identifier is used to determine the first parameter group comprising the K1 parameter sets out of the L1 first-type parameter groups.

In one embodiment, the first receiver 901 comprises at least the first four of the antenna 452, the receiver 454, the multi-antenna receiving processor 458, the receiving processor 456 and the controller/processor 459 in Embodiment 4.

In one embodiment, the first transmitter 902 comprises at least the first four of the antenna 452, the transmitter 454, the multi-antenna transmitting processor 457, the transmitting processor 468 and the controller/processor 459 in Embodiment 4.

Embodiment 10

Figure 10:
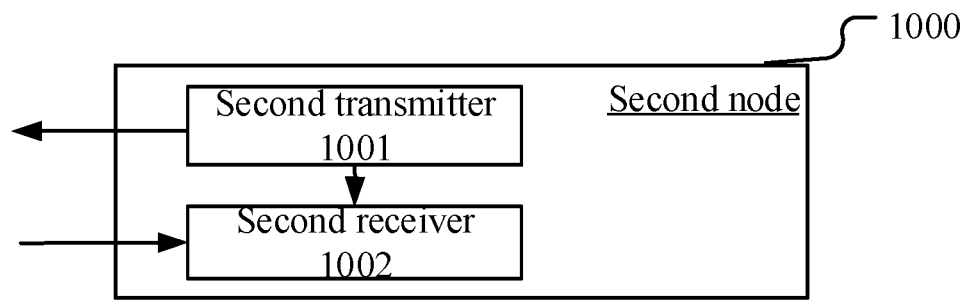
FIG. 10 illustrates a structure block diagram in a second node according to one embodiment of the present disclosure.

Embodiment 10 illustrates a structure block diagram in a second node, as shown in FIG. 10. In FIG. 10, a second node 1000 comprises a second transmitter 1001 and a second receiver 1002.

The second transmitter 1001 transmits a first signaling;
the second receiver 1002 receives a first radio signal and first information in a first time-frequency resource set.

In Embodiment 10, the first signaling is used to determine the first time-frequency resource set, and the first signaling comprises a first field, the first field comprised in the first signaling being used to determine a first parameter set out of K1 parameter sets, the first parameter set comprises K2 first-type parameters, and at least one of the K2 first-type parameters is used to determine a first integer, a number of resource elements occupied by the first information in the first time-frequency resource set is equal to the first integer, the first integer being greater than 0; the K1 parameter sets are related to a first condition set; K1 and K2 are positive integers greater than 1, respectively.

In one embodiment, the first radio signal comprises M1 radio sub-signals, and time-domain resources occupied by any two of the M1 radio sub-signals are orthogonal, each of the M1 radio sub-signals is generated by a first bit block, and the first condition set comprises a value of M1, M1 being a positive integer greater than 1.

In one embodiment, an MCS employed by the first radio signal belongs to a first MCS set, and the first condition set comprises the first MCS set.

In one embodiment, time-frequency resources occupied by the first signaling belong to a candidate time-frequency resource set, and the first condition set comprises the candidate time-frequency resource set.

In one embodiment, time-domain resources occupied by the first signaling belong to a first time unit, while time-domain resources occupied by the first radio signal starts with a second time unit, the second time unit being a T-th time unit after the first time unit, T being a non-negative integer, and the first condition set comprises a value of T.

In one embodiment, the second transmitter 1001 transmits a second signaling and a second radio signal; the second signaling comprises a group of configuration information of the second radio signal, the group of configuration information being comprised of at least one of time-frequency resources occupied, an MCS, a HARQ process ID or a New Data Indicator (NDI); the first information is used to determine whether the second radio signal is correctly received, or the second radio signal is a reference signal and the first information is Channel State Information (CSI) for the reference signal.

In one embodiment, the first radio signal corresponds to a first type, and the second radio signal corresponds to a second type, the first condition set being comprised of the first type and the second type.

In one embodiment, the second transmitter 1001 transmits second information; the second information is used to indicate L1 first-type parameter groups, the L1 first-type parameter groups include a first parameter group, and the first parameter group comprises the K1 parameter sets; the first condition set is used to determine the first parameter group out of the L1 first-type parameter groups.

In one embodiment, a scrambling sequence employed by CRC comprised by the first signaling is generated by a specific identifier, and the specific identifier is used to determine the first parameter group comprising the K1 parameter sets out of the L1 first-type parameter groups.

In one embodiment, the second transmitter 1001 comprises at least the first four of the antenna 420, the transmitter 418, the multi-antenna transmitting processor 471, the transmitting processor 416 and the controller/processor 475 in Embodiment 4.

In one embodiment, the second receiver 1002 comprises at least the first four of the antenna 420, the receiver 418, the multi-antenna receiving processor 472, the receiving processor 470 and the controller/processor 475 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node and the second node in the present disclosure include but are not limited to mobile phones, tablet computers, notebooks, network cards, low-consumption equipment, enhanced MTC (eMTC) equipment, NB-IOT terminals, vehicle-mounted equipment, aircrafts, airplanes, unmanned aerial vehicles, telecontrolled aircrafts, etc. The base station in the present disclosure includes but is not limited to macro-cellular base stations, micro-cellular base stations, home base stations, relay base station, eNB, gNB, Transmitter Receiver Point (TRP), GNSS, relay satellites, satellite base station, aerial base station, RSU and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:
1. A first node for wireless communications, comprising:
a first receiver, receiving a first signaling, a second signaling and a second radio signal;
a first transmitter, transmitting a first radio signal and first information in a first time-frequency resource set;
wherein the first signaling is used to determine the first time-frequency resource set, and the first signaling comprises a first field, the first field comprised in the first signaling being used to determine a first parameter set out of K1 parameter sets, the first parameter set comprises K2 first-type parameters, and at least one of the K2 first-type parameters is used to determine a first integer, a number of resource elements occupied by the first information in the first time-frequency resource set is equal to the first integer, the first integer being greater than 0; the K1 parameter sets are related to a first condition set; K1 and K2 are positive integers greater than 1, respectively; the second signaling comprises a group of configuration information of the second radio signal, the group of configuration information being comprised of at least one of time-frequency resources occupied, an MCS, a HARQ process ID or a New Data Indicator (NDI); the first information is used to determine whether the second radio signal is correctly received, or the second radio signal is a reference signal and the first information is Channel State Information (CSI) for the reference signal; the first radio signal corresponds to a first type, and the second radio signal corresponds to a second type, the first condition set being comprised of the first type and the second type.

2. The first node according to claim 1, wherein the first radio signal comprises M1 radio sub-signals, and time-domain resources occupied by any two of the M1 radio sub-signals are orthogonal, each of the M1 radio sub-signals is generated by a first bit block, and the first condition set comprises a value of M1, M1 being a positive integer greater than 1.

3. The first node according to claim 1, wherein a Modulation and Coding Scheme (MCS) adopted by the first radio signal belongs to a first MCS set, and the first condition set comprises the first MCS set.

4. The first node according to claim 1, wherein time-frequency resources occupied by the first signaling belong to a candidate time-frequency resource set, and the first condition set comprises the candidate time-frequency resource set.

5. The first node according to claim 1, wherein time-domain resources occupied by the first signaling belong to a first time unit, while time-domain resources occupied by the first radio signal starts with a second time unit, the second time unit being a T-th time unit after the first time unit, T being a non-negative integer, and the first condition set comprises a value of T.

6. The first node according to claim 1, wherein the first receiver receives second information; the second information is used to indicate L1 first-type parameter groups, the L1 first-type parameter groups include a first parameter group, and the first parameter group comprises the K1 parameter sets; the first condition set is used to determine the first parameter group out of the L1 first-type parameter groups.

7. The first node according to claim 1, wherein the first condition set comprises a first type and a second type; the first type is URLLC and the second type is eMBB, or, the first type is eMBB and the second type is URLLC.

8. A second node for wireless communications, comprising:
a second transmitter, transmitting a first signaling, a second signaling and a second radio signal; and
a second receiver, receiving a first radio signal and first information in a first time-frequency resource set;
wherein the first signaling is used to determine the first time-frequency resource set, and the first signaling comprises a first field, the first field comprised in the first signaling being used to determine a first parameter set out of K1 parameter sets, the first parameter set comprises K2 first-type parameters, and at least one of the K2 first-type parameters is used to determine a first integer, a number of resource elements occupied by the first information in the first time-frequency resource set is equal to the first integer, the first integer being greater than 0; the K1 parameter sets are related to a first condition set; K1 and K2 are positive integers greater than 1, respectively; the second signaling comprises a group of configuration information of the second radio signal, the group of configuration information being comprised of at least one of time-frequency resources occupied, an MCS, a HARQ process ID or a New Data Indicator (NDI); the first information is used to determine whether the second radio signal is correctly received, or the second radio signal is a reference signal and the first information is Channel State Information (CSI) for the reference signal; the first radio signal corresponds to a first type, and the second radio signal corresponds to a second type, the first condition set being comprised of the first type and the second type.

9. The second node according to claim 8, wherein the first radio signal comprises M1 radio sub-signals, and time-domain resources occupied by any two of the M1 radio sub-signals are orthogonal, each of the M1 radio sub-signals is generated by a first bit block, and the first condition set comprises a value of M1, M1 being a positive integer greater than 1;
or, characterized in that a Modulation and Coding Scheme (MCS) employed by the first radio signal belongs to a first MCS set, and the first condition set comprises the first MCS set;
or, characterized in that time-frequency resources occupied by the first signaling belong to a candidate time-frequency resource set, and the first condition set comprises the candidate time-frequency resource set;
or, characterized in that time-domain resources occupied by the first signaling belong to a first time unit, while time-domain resources occupied by the first radio signal starts with a second time unit, the second time unit being a T-th time unit after the first time unit, T being a non-negative integer, and the first condition set comprises a value of T.

10. The second node according to claim 8, wherein the first condition set comprises a first type and a second type; the first type is URLLC and the second type is eMBB, or, the first type is eMBB and the second type is URLLC.

11. A method in a first node for wireless communications, comprising:
receiving a first signaling, a second signaling and a second radio signal; and
transmitting a first radio signal and first information in a first time-frequency resource set;
wherein the first signaling is used to determine the first time-frequency resource set, and the first signaling comprises a first field, the first field comprised in the first signaling being used to determine a first parameter set out of K1 parameter sets, the first parameter set comprises K2 first-type parameters, and at least one of the K2 first-type parameters is used to determine a first integer, a number of resource elements occupied by the first information in the first time-frequency resource set is equal to the first integer, the first integer being greater than 0; the K1 parameter sets are related to a first condition set; K1 and K2 are positive integers greater than 1, respectively; the second signaling comprises a group of configuration information of the second radio signal, the group of configuration information being comprised of at least one of time-frequency resources occupied, an MCS, a HARQ process ID or a New Data Indicator (NDI); the first information is used to determine whether the second radio signal is correctly received, or the second radio signal is a reference signal and the first information is Channel State Information (CSI) for the reference signal; the first radio signal corresponds to a first type, and the second radio signal corresponds to a second type, the first condition set being comprised of the first type and the second type.

12. The method in the first node according to claim 11, wherein the first radio signal comprises M1 radio sub-signals, and time-domain resources occupied by any two of the M1 radio sub-signals are orthogonal, each of the M1 radio sub-signals is generated by a first bit block, and the first condition set comprises a value of M1, M1 being a positive integer greater than 1.

13. The method in the first node according to claim 11, wherein a Modulation and Coding Scheme (MCS) employed by the first radio signal belongs to a first MCS set, and the first condition set comprises the first MCS set.

14. The method in the first node according to claim 11, wherein time-frequency resources occupied by the first signaling belong to a candidate time-frequency resource set, and the first condition set comprises the candidate time-frequency resource set.

15. The method in the first node according to claim 11, wherein time-domain resources occupied by the first signaling belong to a first time unit, while time-domain resources occupied by the first radio signal starts with a second time unit, the second time unit being a T-th time unit after the first time unit, T being a non-negative integer, and the first condition set comprises a value of T.

16. The method in the first node according to claim 11, comprising:

receiving second information;

wherein the second information is used to indicate L1 first-type parameter groups, the L1 first-type parameter groups include a first parameter group, and the first parameter group comprises the K1 parameter sets; the first condition set is used to determine the first parameter group out of the L1 first-type parameter groups.

17. The method in the first node according to claim 11, wherein the first condition set comprises a first type and a second type; the first type is URLLC and the second type is eMBB, or, the first type is eMBB and the second type is URLLC.

* * * * *